United States Patent
Kanzaki et al.

(10) Patent No.: US 6,877,050 B2
(45) Date of Patent: Apr. 5, 2005

(54) DATA TRANSFER DEVICE AND METHOD THEREOF

(75) Inventors: Eisuke Kanzaki, Fujisawa (JP); Hiroshi Yamashita, Fujisawa (JP); Shohhei Fujio, Machida (JP)

(73) Assignee: International Business Machines Corporation, Armonk, NY (US)

(*) Notice: Subject to any disclaimer, the term of this patent is extended or adjusted under 35 U.S.C. 154(b) by 505 days.

(21) Appl. No.: 09/682,611

(22) Filed: Sep. 26, 2001

(65) Prior Publication Data

US 2002/0038396 A1 Mar. 28, 2002

(30) Foreign Application Priority Data

Sep. 26, 2000 (JP) ........................................ 2000-291644

(51) Int. Cl.[7] ............................................. G06F 13/00
(52) U.S. Cl. ...................... 710/100; 710/300; 710/305; 710/320
(58) Field of Search ............................... 710/100, 305; 713/300, 320

(56) References Cited

U.S. PATENT DOCUMENTS

| | | | | |
|---|---|---|---|---|
| 4,667,337 A | * | 5/1987 | Fletcher ....................... | 377/41 |
| 5,781,742 A | | 7/1998 | Asano et al. ................ | 395/280 |
| 5,890,005 A | * | 3/1999 | Lindholm ................... | 713/320 |
| 5,931,927 A | * | 8/1999 | Takashima ................... | 710/65 |
| 6,208,177 B1 | * | 3/2001 | Knoedl, Jr. ................. | 327/108 |
| 6,243,779 B1 | * | 6/2001 | Devanney et al. .......... | 710/305 |
| 6,553,445 B1 | * | 4/2003 | Drapkin et al. ............. | 710/305 |
| 6,584,572 B1 | * | 6/2003 | Choi .......................... | 713/320 |

FOREIGN PATENT DOCUMENTS

JP  04303234 A  * 10/1992  ............. G06F/5/00

OTHER PUBLICATIONS

Hong, Sungpack, et al., "bus–Invert Coding for Low Power I/O—A Decomposition Approach," Aug. 8–11, 2000, Proceedings of the 43rd IEEE Midwest Symposium on Circuites and Systems, vol. 2, p. 750–752.*

Stan, Mircea R., et al., "Bus–Invert Coding for Low–Power I/O," Mar. 3, 1995, IEEE Transactions on Very Large Scale Integration (VLSI) Systems, vol. 3, Issue 1, p. 49–58.*

* cited by examiner

*Primary Examiner*—Mark H. Rinehart
*Assistant Examiner*—Donna K. Mason
(74) *Attorney, Agent, or Firm*—McGinn & Gibb, PLLC; Derek S. Jennings

(57) ABSTRACT

When data is transferred from a controller of a liquid crystal display device to each driver through a predetermined number of signal lines, the Transferring Data are divided into a plurality of groups by forming the signal lines into groups beforehand. For each group, the combination of inversion/non-inversion of the data to be transmitted is examined, a well-balanced combination is selected so as to reduce EMI.

15 Claims, 15 Drawing Sheets

FIG. 5

| GROUP A | GROUP B | PROCESSING |
|---|---|---|
| IN RANGE | IN RANGE | ⇒ [I] |
| OUT OF RANGE | OUT OF RANGE | ⇒ [II] |
| IN RANGE | OUT OF RANGE | ⇒ [III] |
| OUT OF RANGE | IN RANGE | ⇒ [III] |

FIG. 6

| COMBINATION | GROUP A | | | GROUP B | | |
|---|---|---|---|---|---|---|
| 1 | Normal | CountH2LA, | CountL2HA | Normal | CountH2LB, | CountL2HB |
| 2 | Normal | CountH2LA, | CountL2HA | Inv | iCountH2LB, | iCountL2HB |
| 3 | Inv | iCountH2LA, | iCountL2HA | Normal | CountH2LB, | CountL2HB |
| 4 | Inv | iCountH2LA, | iCountL2HA | Inv | iCountH2LB, | iCountL2HB |

FIG. 7

| COMBINATION | TotalDiffCount | TotalCountAll |
|---|---|---|
| 1 | DiffCountA + DiffCountB | CountH2LA + CountL2HA + CountH2LB + CountL2HB |
| 2 | DiffCountA + iDiffCountB | CountH2LA + CountL2HA + iCountH2LB + iCountL2HB |
| 3 | iDiffCountA + DiffCountB | iCountH2LA + iCountL2HA + CountH2LB + CountL2HB |
| 4 | iDiffCountA + iDiffCountB | iCountH2LA + iCountL2HA + iCountH2LB + iCountL2HB |

FIG. 8

<case1>

A

| | GROUP A | GROUP B | AB Total |
|---|---|---|---|
| CountH2L | 7 | 1 | 8 |
| CountL2H | 6 | 12 | 18 |
| iCountH2L | 3 | 10 | 13 |
| iCountL2H | 8 | 1 | 9 |

B

1

| | GROUP A (Normal) | GROUP B (Normal) | AB Total | |
|---|---|---|---|---|
| | 7 | 1 | ⑧ (D) | |
| | 6 | 12 | ⑱ (E) | ⑩ (C) |
| | ① (A) | ① (B) | | |

2

| | GROUP A (Normal) | GROUP B (Inv) | AB Total | |
|---|---|---|---|---|
| | 7 | 10 | ⑰ (D) | |
| | 6 | 1 | ⑦ (E) | ⑩ (C) |
| | ① (A) | ⑨ (B) | | |

3

| | GROUP A (Inv) | GROUP B (Normal) | AB Total | |
|---|---|---|---|---|
| | 3 | 1 | ④ (D) | |
| | 8 | 12 | ⑳ (E) | ⑯ (C) |
| | ⑤ (A) | ⑪ (B) | | |

4

| | GROUP A (Inv) | GROUP B (Inv) | AB Total | |
|---|---|---|---|---|
| | 3 | 10 | ⑬ (D) | |
| | 8 | 1 | ⑨ (E) | ④ (C) |
| | ⑤ (A) | ⑨ (B) | | |

FIG. 9

<case2>

A

| | GROUP A | GROUP B | AB Total |
|---|---|---|---|
| CountH2L | 7 | 1 | 8 |
| CountL2H | 6 | 12 | 18 |
| iCountH2L | 3 | 6 | 9 |
| iCountL2H | 8 | 5 | 13 |

<case3>

A

| | GROUP A | GROUP B | AB Total |
|---|---|---|---|
| CountH2L | 7 | 1 | 8 |
| CountL2H | 6 | 12 | 18 |
| iCountH2L | 10 | 6 | 16 |
| iCountL2H | 1 | 5 | 6 |

B

1

| GROUP A (Normal) | GROUP B (Normal) | AB Total |
|---|---|---|
| 7 | 1 | ⑧ (D) |
| 6 | 12 | ⑱ (E) |
| ① (A) | ① (B) | ⑩ (C) |

2

| GROUP A (Normal) | GROUP B (Inv) | AB Total |
|---|---|---|
| 7 | 6 | ⑬ (D) |
| 6 | 5 | ⑪ (E) |
| ① (A) | ① (B) | ② (C) |

3

| GROUP A (Inv) | GROUP B (Normal) | AB Total |
|---|---|---|
| 10 | 1 | ⑪ (D) |
| 1 | 12 | ⑬ (E) |
| ⑨ (A) | -①① (B) | -② (C) |

4

| GROUP A (Inv) | GROUP B (Inv) | AB Total |
|---|---|---|
| 10 | 6 | ⑯ (D) |
| 1 | 5 | ⑥ (E) |
| ⑨ (A) | ① (B) | ⑩ (C) |

FIG. 12

<case5>

A

| | GROUP A | GROUP B | AB Total |
|---|---|---|---|
| CountH2L | 7 | 7 | 14 |
| CountL2H | 3 | 3 | 6 |
| iCountH2L | 7 | 7 | 14 |
| iCountL2H | 7 | 7 | 14 |

B

1

| | GROUP A (Normal) | GROUP B (Normal) | AB Total |
|---|---|---|---|
| | 7 | 7 | (14)(D) |
| | 3 | 3 | (6)(E) |
| | | | (8)(C) |
| | (4)(A) | (4)(B) | |

2

| | GROUP A (Normal) | GROUP B (Inv) | AB Total |
|---|---|---|---|
| | 7 | 7 | (14)(D) |
| | 3 | 7 | (10)(E) |
| | | | (4)(C) |
| | (4)(A) | (0)(B) | |

3

| | GROUP A (Inv) | GROUP B (Normal) | AB Total |
|---|---|---|---|
| | 7 | 7 | (14)(D) |
| | 7 | 3 | (10)(E) |
| | | | (4)(C) |
| | (0)(A) | (4)(B) | |

4

| | GROUP A (Inv) | GROUP B (Inv) | AB Total |
|---|---|---|---|
| | 7 | 7 | (14)(D) |
| | 7 | 7 | (14)(E) |
| | | | (0)(C) |
| | (0)(A) | (0)(B) | |

FIG. 15

| | Group 1 | Group 2 | · · · | Group i |
|---|---|---|---|---|
| A Normal | CountH2L(1)<br>CountL2H(1) | CountH2L(2)<br>CountL2H(2) | · · ·<br>· · · | CountH2L(j)<br>CountL2H(j) |
| Inverted | iCountH2L(1)<br>iCountL2H(1) | iCountH2L(2)<br>iCountL2H(2) | · · ·<br>· · · | iCountH2L(j)<br>iCountL2H(j) |

B  DiffCount(j)    =   CountH2L(j)  −  CountL2H(j)
   iDiffCount(j)   =   iCountH2L(j) −  iCountL2H(j)

C  TotalDiffCount(k)  =  ?DiffCount(1) + ?DiffCount(2) + · · · + ?DiffCount(n)

D  TotalCountAll(k)   =  ?CountH2L(1) + ?CountL2H(1)
                      +  ?CountH2L(2) + ?CountL2H(2)
                      +  · · ·
                      +  ?CountH2L(n) + ?CountL2H(n)

where ? is blank or "i"

DATA TRANSFER DEVICE AND METHOD THEREOF

BACKGROUND OF INVENTION

The present invention relates to a data transfer device and method thereof.

In the display device made available in recent years, such as a Liquid Crystal Display (LCD) or the like, pixel data for representing an image has been treated not in an analog system but in a digital system. Especially with recent improvement on performance, there has been an increase in the quantity of data to be transferred.

When data transfer is performed through a bus in the digital system, in order to deal with the increased quantity of data, the number of signal lines constituting the bus must be increased unless a frequency is increased. Consequently, the bus is enlarged. Thus, if the frequency of data transfer is set high, radiation of an electromagnetic wave, i.e., Electro-Magnetic Interference (hereinafter referred to as EMI,) or the like occurs when data (digital signals of "1": high, and "0": low) flows through the signal lines.

The EMI occurs when transferring data, which differs from data, transferred immediately therebefore (data is changed from high to low, or from low to high), and characteristically becomes more conspicuous as the number of data to be changed is increased.

Therefore, the background art has presented methods of inverting data in a case where data changes at a predetermined number or more of signal lines constituting the bus. One of the examples is a method disclosed in Japanese Patent Laid-Open Hei 4 (1992)-303234.

According to such a method, if "data to be transferred" (hereinafter referred to as Transferring Data) differs from "data transferred immediately before" (hereinafter referred to as Proximate Data) at a half or more of the number of signal lines constituting the bus, this Transferring Data is inverted (to low when data is high, and to high when data is low). Specifically, when inverting, the data changing style in which the data is changed from low to high (from high to low) becomes the style in which the data is changed from high to high (from low to low), thus no changes occur. The data changing style before inverting, in which the data is changed from high to high (from low to low) becomes the style, in which the data is changed from high to low (from low to high). Thus, by inverting the Transferring Data, the number of data to be changed is reduced for all the signal lines constituting the bus, and the EMI or the like is thereby suppressed.

When the data is inverted in the foregoing manner, a signal indicating the execution of inversion (hereinafter referred to as an inversion bit) is simultaneously transferred from a transmission side. This inversion bit is transferred by allocating one of the signal lines constituting the bus thereto. For example, a signal "0" is transferred when no data inversion is performed, and a signal "1" when inversion is carried out. At a receiving side, when the data and the inversion bit are received, the data is returned to the state before the inversion, and then subjected to predetermined processing.

According to the foregoing technology of the conventional art, for example, if the Transferring Data through the bus is all changed, it is possible to greatly reduce the total number of data to be changed through all the signal lines constituting the bus by inverting the data.

As an example, assuming that a half or more of the number of Transferring Data the bus is changed, the data is inverted. However, a difference in states between before and after the inversion may be small, and the advantage of suppressing EMI, obtained by the inversion, may also be limited. Therefore, in the technology of the conventional art, the suppression of EMI by the data inversion cannot always be effective.

Such a problem is not limited to the transfer of pixel data at the display device, but common to the transfer of data through the bus or the like, especially when the number of data bits to be transferred in synchronization is large.

SUMMARY OF INVENTION

The present invention was made to solve the foregoing problem, and objects of the invention are to provide a data transfer device, a display device, a data transmitter, a data receiver, and a data transfer method, which are capable of suppressing EMI more effectively.

In order to achieve the foregoing object, a feature of the present invention includes a data transfer device having a transmitting block for transmitting data and a receiving block for receiving the data. The transmitting block includes a determination unit for dividing the signal lines into a plurality of groups, and determining inversion/non-inversion of Transferring Data, regarding data transferred through each group of the signal lines, an inversion unit for inverting the Transferring Data for the group determined to be subjected to inversion by the determination unit, and a transmission unit for transmitting data to the signal lines. The receiving block includes a receiving unit for receiving the data transferred, and a decoding unit for returning data of the group having been subjected to data inversion by the inversion unit to an original state.

Another feature of the present invention includes a display device a plurality of drivers for driving a display panel, a controller that includes a determination unit for determining whether inversion should be performed or not for each group, regarding digital signals to be transferred, an inversion unit for inverting the digital signals for the group determined to be subjected to the inversion, and a transmission unit. Each driver includes a receiving unit, and a decoding unit for returning the digital signals of the group having been subjected to digital signal inversion to an original state.

Features of the present invention further includes a data transmitter having a counting circuit for counting the number of data to be changed between Transferring Data and Proximate Data for each group, a selection circuit for selecting either inversion or non-inversion for data to be transmitted; and an inversion circuit for inverting the Transferring Data for the group determined to be subjected to inversion.

Yet another feature of the present invention includes a data receiver having a receiving unit for receiving data transferred after having been divided into a plurality of groups, an inversion bit determination unit for determining affixment of an inversion bit to the data received for each group, and a decoding unit for inverting the data received for the group determined to have the affixment of the inversion bit.

Features of the present invention still further include a data transfer method being characterized by presetting either inversion or non-inversion of Transferring Data for each group regarding first Transferring Data when starting data transfer. Thus, at the time of starting the data transfer, EMI can be suppressed at the first data.

A data transfer method is characterized by the steps of: at a data transmission side, Transferring Data is divided into a plurality of groups, performing either inversion or non-inversion of the Transferring Data in order to minimize a sum total of changes of data of all the groups, and transmitting the Transferring Data; and at a data receiving side, receiving and inverting said data for the group having been subjected to data inversion.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

For a more complete understanding of the present invention and the advantages thereof, reference is now made to the following description taken in conjunction with the accompanying drawings.

FIG. 5 shows a table for processing according to the presence of the number of data to be changed for the control range shown in FIG. 4.

FIG. 6 is a table showing the combinations of inversion/non-inversion regarding data divided into two groups.

FIG. 7 is a table showing a calculation method for each combination.

FIGS. 8A and 8B are views showing a first case as an example of the present invention, i.e., FIG. 8A shows an example of the number of data to be changed, and FIG. 8B shows a sum total of changes of data and the total number of data to be changed for each combination.

FIGS. 9A and 9B are views showing a second case as an example of the present invention, i.e., FIG. 9A shows an example of the number of data to be changed, and FIG. 9B shows a sum total of changes of data and the total number of data to be changed for each combination.

FIGS. 10A and 10B are views showing a third case as an example of the present invention, i.e., FIG. 10A shows an example of the number of data to be changed, and FIG. 10B shows a sum total of changes of data and the total number of data to be changed for each combination.

FIG. 11A shows an example of the number of data to be changed, and FIG. 11B shows a sum total of changes of data and the total number of data to be changed for each combination.

FIGS. 12A and 12B are views showing a fifth case as an example of the present invention, i.e., FIG. 12A shows an example of the number of data to be changed and FIG. 12B shows a sum total of changes of data and the total number of data to be changed for each combination.

FIG. 13A shows an example of the number of data to be changed, and FIG. 13B shows a sum total of changes of data and the total number of data to be changed for each combination.

FIGS. 15A to 15D are views showing a processing method in the case of dividing data into a plurality of groups, i.e., FIG. 15A shows the number of data to be changed for each group, FIG. 15B shows a calculation equation for the sum of changes of data for each group, FIG. 15C shows a calculation equation for the sum total of changes of data regarding all the data, and FIG. 15D shows a calculation equation for the number of data to be changed regarding all the data.

DETAILED DESCRIPTION

Figure 1:
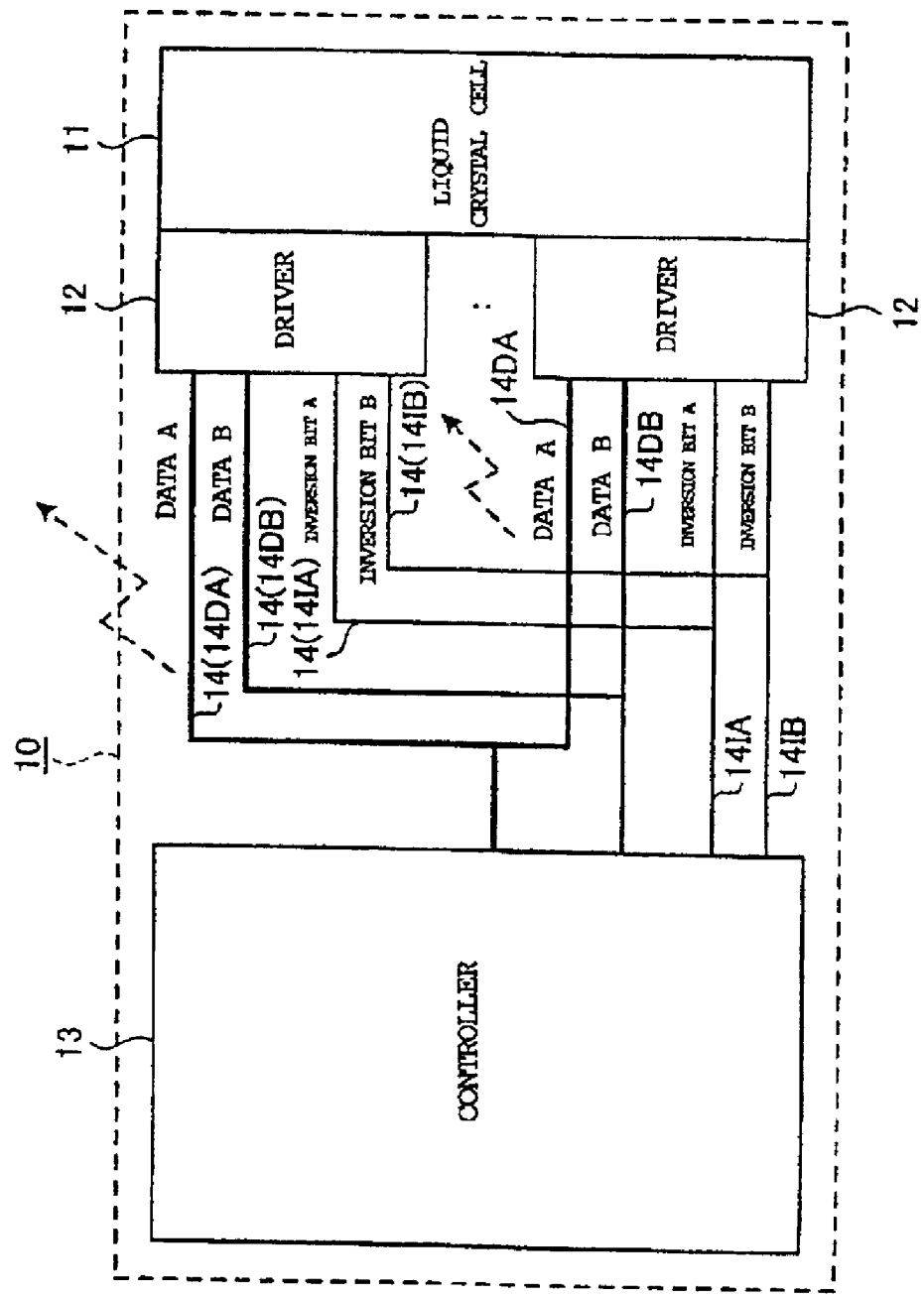
FIG. 1 shows a configuration of a liquid crystal display device according to an embodiment of the present invention.

Next, a preferred embodiment of the present invention will be described in detail with reference to the accompanying drawings. Here, a data transfer device, a display device, the data transmitter, a data receiver, and a data transfer method of the invention are applied to, for example, data transfer between a driver and a controller of a liquid crystal display device.

The determination unit should count the number of Transferring Data different from Proximate Data for each group, and select a combination of inversion/non-inversion of each group based on a result of the counting in order to minimize a sum total of changes of data for all the groups.

Accordingly, by determining whether the Transferring Data should be inverted or not for each group, it is possible to reduce the sum total of changes of data between the Transferring Data and the Proximate Data.

Moreover, the transmitting block may further include an inversion signal output unit for outputting a signal indicating completed inversion in synchronization with data of the group, regarding the group having been subjected to the inversion.

During data transfer between the driver for driving a liquid crystal cell and the controller, it is possible to reduce the sum total of changes of data between the Transferring Data and the Proximate Data.

Data is divided into a plurality of groups, and the sum total of changes of data is reduced by selecting inversion/non-inversion for each group. In this case, in addition to the division of the data into the plurality of groups, the inversion/non-inversion of the Transferring Data is selected for each group based on whether the counted number of data to be changed for each group is in a predetermined range or not. Especially, by setting the range to include less than n/2 regarding n-bit data transmitted for each group, it is possible to reduce the sum total of changes of data more effectively.

More specifically, when the numbers of data to be changed are in the predetermined range for all the groups, the selection circuit selects inversion/non-inversion of each group in order to reduce a sum total of changes of data of all the groups. In this case, it is not always necessary to set the sum total of changes of data for all the groups to be minimum. For example, the sum total can be "equal to a predetermined value or lower".

When the numbers of data to be changed are out of the predetermined range for all the groups, the selection circuit selects inversion of data regarding a group having the number of data to be changed exceeding the predetermined range, and selects non-inversion of data regarding a group having the number of data to be changed below the predetermined range.

Further, when the number of data to be changed, i.e., a value obtained by adding up the number of data to be changed in one direction, and the number of data to be changed in an opposite direction, is out of the predetermined range for at least one group, the selection circuit selects inversion of data if the number of data to be changed exceeds the predetermined range regarding the group out of the range, and non-inversion of data if the number of data to be changed is below the predetermined range, and then regarding the other group having the number of data to be changed set in the predetermined range, the selection circuit compares the case of data inversion with the case of data non-inversion, and selects the case having data of a lower amount of changes, which is a value obtained by subtracting the numbers of data to be changed in one and opposite directions from each other.

In the data transfer method, combinations of either inversion or non-inversion data of all the groups are examined; and when a result of the combination examination shows that there are a plurality of combinations for minimizing a sum total of changes of data of all the groups, a combination having a smallest number of data to be changed may be selected.

More specifically, in the data transfer method, for each group, the number of data to be transmitted, which is low and the Proximate Data is high, and Transferring Data which is high and the Proximate Data is low (CountH2L and CountL2H), and Transferring Data which is low and the Proximate Data is high, and data to be transmitted, which is high and the number of Transferring Data is low, in the case of inverting the Transferring Data to be transmitted (iCountH2L, and iCountL2H) are counted. Variation of data to be changed (DiffCount=Count2HL−CounteL2H) for each group and the variation of data to be changed (iDiffCount= iCountH2L−iCountL2H) for each group in the case of inverting the data are calculated. Based on the variations of data to be changed (DiffCount, and iDiffCount) for each group, a combination for minimizing a sum total of changes of data of all the groups is selected.

FIG. 1 schematically illustrates the configuration of the liquid crystal display device of the embodiment. A reference numeral 10 denotes a liquid crystal display device (display device). Included within the display is a liquid crystal cell (display panel) constituting the display screen of the liquid crystal display device 10 and a plurality of drivers 12 for driving the liquid crystal cell 11, connected to an electrode of the liquid crystal cell 11. Further included is a controller 13 for controlling the plurality of drivers 12, and transferring data as a digital signal to each driver 12 in order to display an image by the liquid crystal cell 11.

In this case, the controller 13 and each driver 12 constituting the data transfer device are interconnected through a bus including a predetermined number of signal lines 14. It is now assumed that the total number of signal lines 14 for the bus is 50 lines, and among these signal lines, 48 lines are used for data transfer while the remaining 2 lines are used for inversion bit transfer. According to the embodiment, 48 signal lines 14 for data transfer are divided into, for example two groups, 24 lines are set as the signal lines 14DA of a group A, and remaining 24 lines as the signal lines 14DB of a group B. Corresponding to the signal lines 14DA and 14DB respectively of the groups A and B, totally 2 signal lines 14 for inversion bit transfer are set as the signal line 14IA of the group A for the inversion bit transfer, and the signal line 14IB of the group B for the inversion bit transfer.

Thus, when data is transferred from the controller 13 to each driver 12 through the above-described 48 signal lines 14 in total, the data is divided into a plurality of groups, e.g., two groups (groups A and B) and then transferred.

Figure 2:
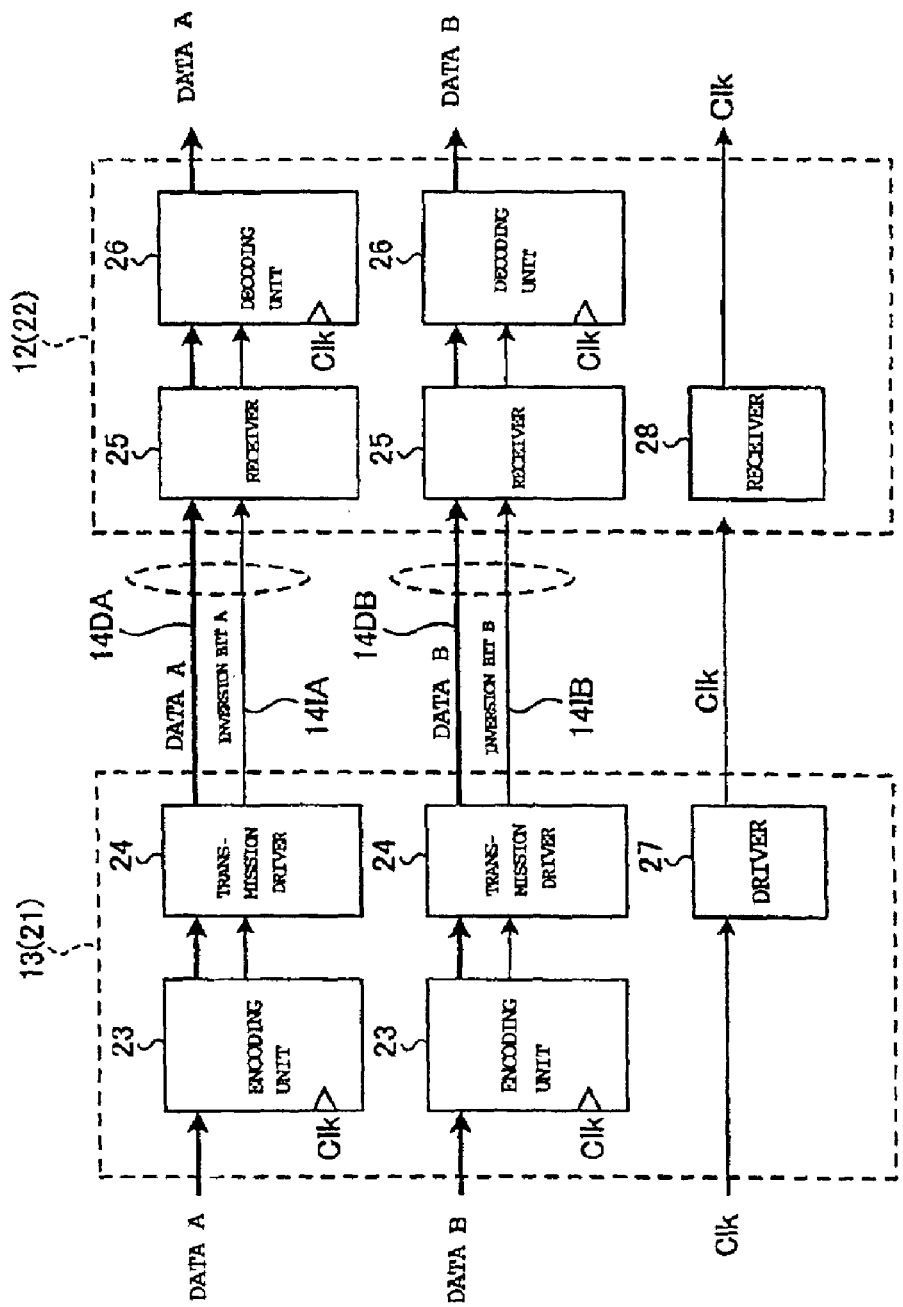
FIG. 2 is a block diagram showing data transmitting and receiving blocks.

FIG. 2 illustrates a circuitry for performing signal transfer between the controller 13 and one of the drivers 12. In FIG. 2, a reference numeral 21 denotes a transmitting block (data transmitter) provided in the controller 13 (see FIG. 1) as a data transmission side; and 22 a receiving block (data receiver) provided in each driver 12 (FIG. 1) as a data receiving side.

Between the transmitting and receiving blocks 21 and 22, as described above, Transferring Data is divided into two groups. i.e., groups A and B, and then transferred (in the drawing, the data of the group A is represented as "_DATA A", and the data of the group B as "DATA B"). Corresponding to each of the groups A and B, the transmitting block 21 includes an encoding unit 23 and a transmission driver (transmission unit) 24, and the receiving block 22 includes a receiver (receiving unit) 25 and a decoding unit 26. In addition, between the transmitting and receiving blocks 21 and 22, a clock signal of a predetermined frequency generated by a clock generator, not shown, is transferred from a driver 27 of the transmitting block 21 to a receiver 28 of the receiving block 22, and data is transferred in synchronization with this clock signal.

Figure 3:
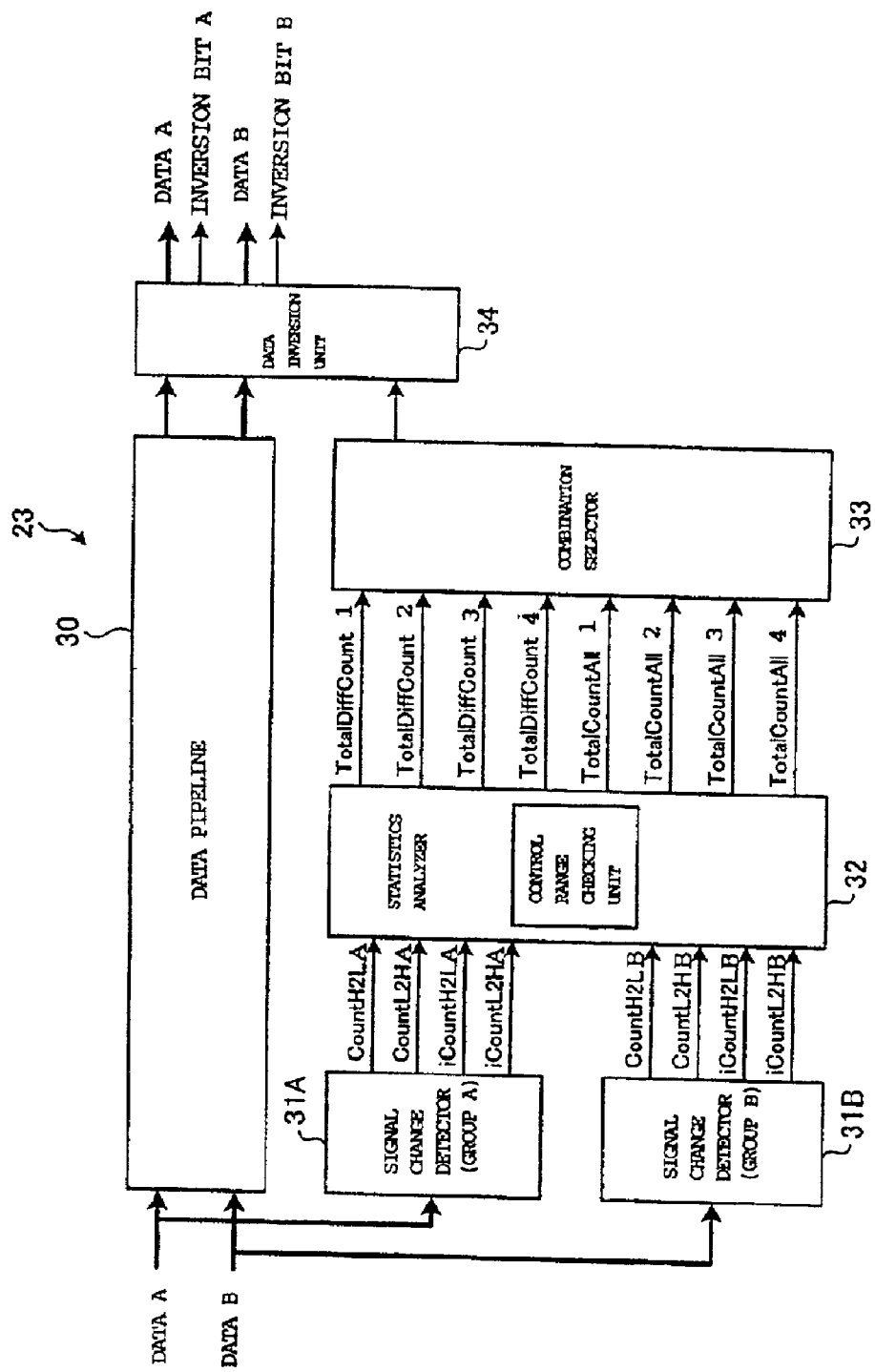
FIG. 3 shows a circuitry for determining whether data should be inverted or not.

FIG. 3 illustrates the processing carried out at the encoding unit 23 of the transmitting block 21 at the time of data transmission.

The encoding unit 23 includes, in addition to a data pipeline 30 for temporarily storing Transferring Data (at least data equivalent to 2 clocks, in this case), signal change detectors (counting circuits) 31A and 31B, a statistics analyzer 32 and a combination selector (selection circuit) 33 constituting a determination unit, and a data inversion unit 34 constituted of an inversion unit, an inversion signal output unit and an inversion circuit.

The signal change detectors 31A and 31B investigate difference (switching) between Transferring Data and Proximate Data for each signal line 14 in the groups A and B. In this case, Proximate Data is obtained by referring to the data stored in the data pipe line 30.

Further, at the signal change detectors 31A and 31B, based on the difference between Transferring Data and "data transferred immediately before" investigated for each signal line 14, the following are counted for each of the groups A and B:

the number of data to be changed from high to low ("H2L" in the drawing) ("CountH2LA" and "CountH2LB" in the drawing: A and B at the ends indicate group titles, the same applicable thereinafter);

the number of data to be changed from low to high ("CountL2HA" and "CountL2HB" in the drawing);

the number of data to be changed from high to low when Transferring Data is inverted (in other words, data to be changed from high to high unless inverted) ("iCountH2LA" and "iCountH2LB" in the drawing); and the number of data to be changed from low to high when Transferring Data is inverted (in other words, data to be changed from low to low unless inverted) ("iCountL2HA" and "iCountL2HB" in the drawing,).

Based on the results of counting carried out by the signal change detectors 31A and 31B, the statistics analyzer 32 performs analysis for determination as to whether data should be inverted or not, for each of the groups A and B in a manner described below.

Figure 4:
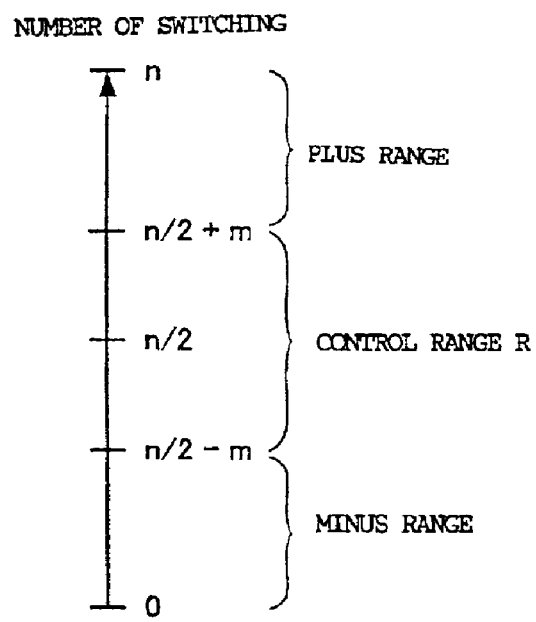
FIG. 4 shows a control range set for the determination as to the inversion of data.
Figure 11:
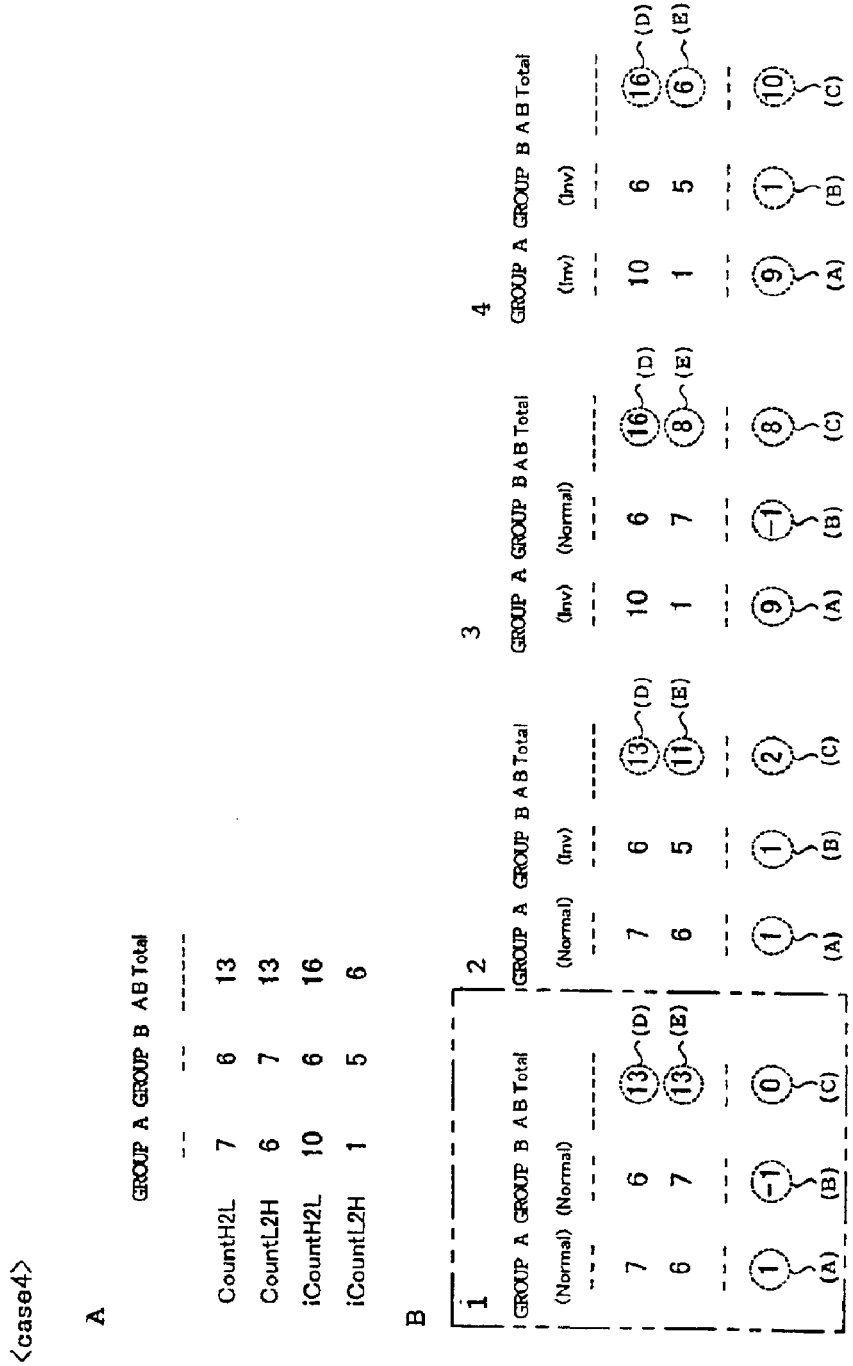
FIGS. 11A and 11B are views showing a fourth case as an example of the present invention, i.e.
Figure 13:
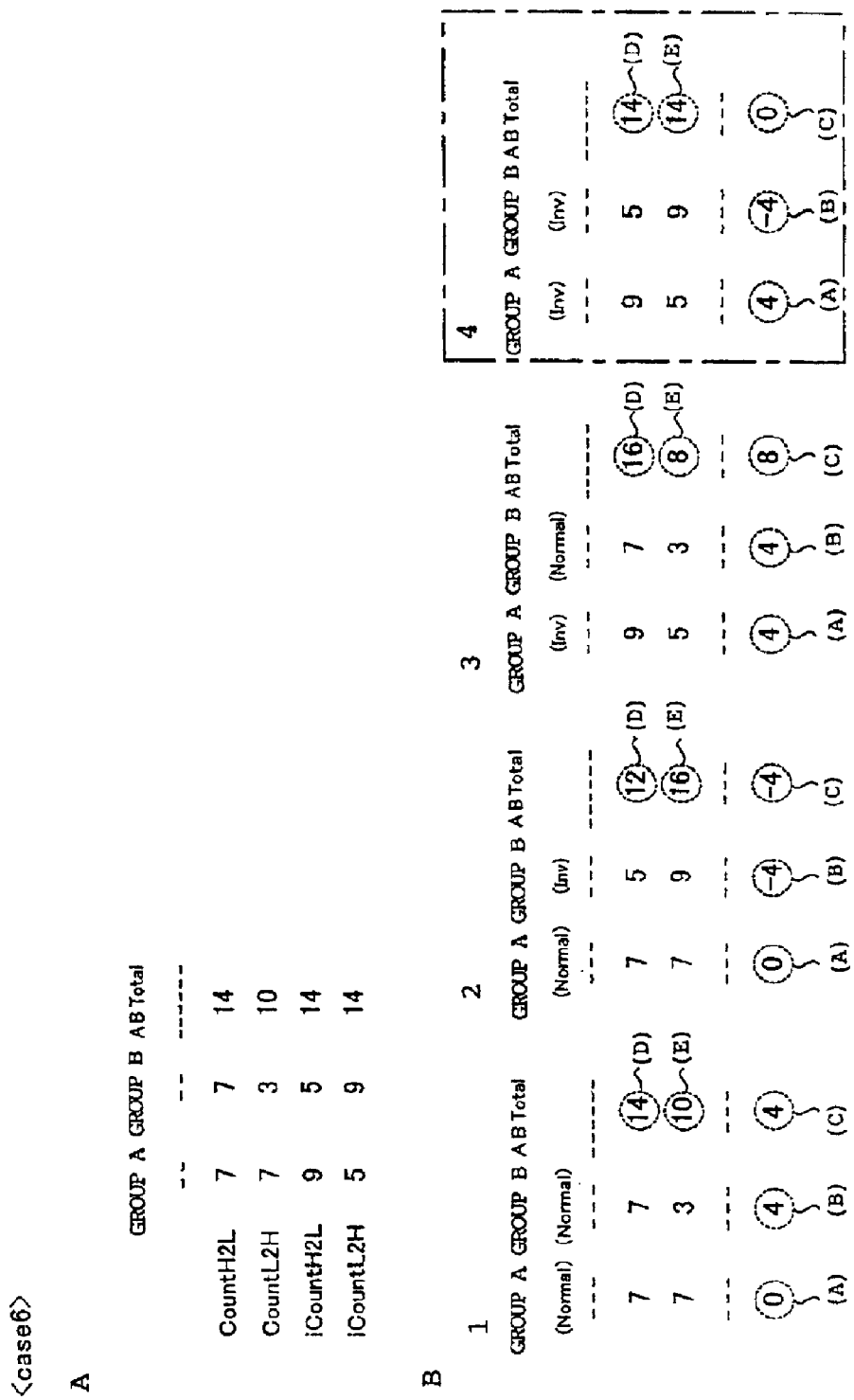
FIGS. 13A and 13B are views showing a sixth case as an example of the present invention, i.e.

That is, at the statistics analyzer 32, as shown in FIG. 4, a control range (predetermined range) R has been set. This control range R is set at $(n/2)\pm m$ with respect to the total number n of data for each of the groups A and B (=number of signal lines 14DA or 14DB: 24 each in the described case). Here, m is an arbitrary number of m $\leq$ n/2, and may be set as occasion demands.

Then, based on the results of counting carried out by the signal change detectors 31A and 31B, the sum of data to be changed from high to low and from low to high (CountAllA=CountH2LA+CountL2HA, or CountAllB= CountH2LB+CountL2HB) is obtained for each of the groups A and B.

Then, determination is made as to whether each of the numbers of data to be changed for the groups A and B (CountAllA and CountAllB) is in the control range R or not. According to the result of the determination, as shown in the table of FIG. 5, processing operations I, II and III described below are performed.

I

When the numbers of data to be changed for the groups A and B are both in the control range R, based on the results of counting carried out by the signal change detectors 31A and 31B, the statistics analyzer 32 examines the combinations of the following four cases as shown in the table of FIG. 6:

1. neither data of the groups A and B is inverted;
2. the data of the group B is inverted while the data of the group A is not;
3. the data of the group A is inverted while the data of the group B is not; and
4. both data of the groups A and B is inverted.

In FIG. 6, "Normal" means non-execution of data inversion, while "Inv" means execution of the data inversion.

In the described examination, in the cases of data inversion and non-inversion for each of the groups A and B, data variation (DiffCount) is obtained from a difference between the number of data to be changed from high to low and the number of data to be changed from low to high.

Based on the foregoing, as shown in FIG. 7, for each combination of the above 1 to 4, calculation is made as to the total sum of changes of data changed from high to low and from low to high in total of the groups A and B, i.e., for all the data transferred in synchronization (data of totally 48 bits in the embodiment) ("TotalDiffCount" in FIG. 7 ). In addition, for each combination of the above 1 to 4, calculation is made as to the sum of the number of data to be changed from high to low and the number of data to be changed from low to high ("TotalCountAll" in FIG. 7 ) in total of the groups A and B. Here, irrespective of the changes from high to low or from low to high, the total number of data to be changed among the all the data transferred in synchronization is calculated of the groups A and B for each combination of the above 1 to 4.

The data variation when the data of the group A is inverted is obtained as follows:

$$i\text{DiffCountA} = i\text{CountH2LA} - i\text{CountL2HA} \quad (2)$$

Similarly, the data variation when the data of the group B is not inverted is obtained as follows:

$$\text{DiffCountB} = \text{CountH2LB} - \text{CountL2HB} \quad (3)$$

The data variation when the data of the group B is inverted is obtained as follows:

$$i\text{DiffCountB} = i\text{CountH2LB} - i\text{CountL2HB} \quad (4)$$

In each of the above cases, the data changed from high to low and the data changed from low to high of the same number cancel EMI each other for each group and, accordingly, the number of data remaining without having been canceled is calculated.

Based on the foregoing, as shown in FIG. 7, for each combination of the above 1 to 4, calculation is made as to the total sum of changes of data changed from high to low and from low to high in total of the groups A and B, i.e., for all the data transferred in synchronization (data of totally 48 bits in the embodiment) ("TotaiDiffCount" in FIG. 7). in addition, for each combination of the above 1 to 4, calculation is made as to the sum of the number of data to be changed from high to low and the number of data to be changed from low to high ("TotalCountAll" in FIG. 7) in total of the groups A and B. Here, irrespective of the changes from high to low or from low to high, the total number of data to be changed among the all the data transferred in synchronization is calculated of the groups A and B for each combination of the above 1 to 4.

The results of calculation, i.e., "TotalDiffCount" and "TotalCountAll", for each combination of the above 1 to 4, carried out at the statistics analyzer 32, are then outputted to the combination selector 33. Upon having received the results of calculation, the combination selector 33 selects an optimal combination among the combinations of 1 to 4.

For this selection, first, from the combinations of 1 to 4, a combination having a smallest absolute value of "TotalDiffCount" is selected. The combination thus selected becomes one having the smallest total sum of changes of data between the Transferring Data and the Proximate Data.

In the combinations of the above 1 to 4, if there is a plurality of combinations having the smallest absolute value of "TotalDiffCount", then, a combination having the smallest "TotalCountAll" is selected. Accordingly, a combination having a smaller total number of data to be changed of the groups A and B is selected.

II

When the numbers of data to be changed for the groups A and B (CountAllA and CountAllB, respectively) are both out of the control range R, if the numbers of data to be changed exceed the control range R ("plus range" in FIG. 4), then the data of the groups A and B are both inverted (II–1), and if the numbers of data to be changed are below the control range R ("minus range" in FIG. 4), then neither data of the groups A and B are inverted, and maintained as they are (II–2).

III

When one of the numbers of data to be changed for the groups A and B (CountAllA and CountAllB) is out of the control range R, and the other is in the control range R, the combination selector 33 determines the inversion/non-inversion of data by a method described below.

For the group, of which the number of data to be changed is out of the control range R (one of the groups A and B), if the number of data to be changed exceeds the control range R ("plus range" in FIG. 4), then the data is inverted (III–1). If the number of data to be changed is below the control range R ("minus range" in FIG. 4), then the data is not inverted (III–2).

For the group, of which the number of data to be changed is in the control range R (one of the groups A and B), for example if the number of data to be changed of the group A is in the control range R, DiffCountA and iDiffCountA are obtained by the foregoing equations (1) and (2) respectively, and one having a smaller numerical value thereof is selected. Then, if iDiffCountA is selected, the data of the group A is inverted. If the number of data to be changed of the group B is in the control range R, similarly DiffCountB and iDiffCountB are obtained by the equations (3) and (4) respectively, and one having a smaller numerical value thereof is selected. Also in this case, if iDiffCountB is selected, the data of the group B is inverted.

As shown in FIG. 3, the data inversion unit 34 fetches Transferring Data from the data pipeline 30. Then, at this data inversion unit 34, based on the result of decision (selection) by the combination selector 33, the fetched data is inverted if it is necessary to invert the data of one or both of the groups A and B.

The data of the groups A and B inverted when necessary are transferred to the transmission driver 24 through the signal lines 14DA and 14DB shown in FIG. 2. In this case, if the data of the groups A and B have been inverted, the data inversion unit 34 transfers inversion bits (inversion bits A and B in FIGS. 2 and 3) as signals indicating execution of the inversion in synchronization through the signal lines 14IA and 14IB respectively.

The transmission driver 24 outputs the data and the inversion bits of the groups A and B, which have been transferred from the data inversion unit 34 through the signal lines 14DA, 14DB, 14IA and 14IB to the receiving block 22 of the driver 12.

Thus, in order to reduce the total number of data to be changed for the entire data, the data is divided into the two groups A and B, inverted when necessary, and then transmitted from the controller 13 (transmitting block 21) side.

The data having been transmitted from the controller 13 in the foregoing manner is received by the receiver 25 of each driver 12 (receiving block 22) side.

Then, at the decoding unit 26, the data received by the receiver 25 is subjected to decoding. In this case, the decoding unit 26 functions as an inversion bit determination unit to determine the affixment of an inversion bit to one or both of the groups A and B. If the inversion bit has been affixed, for the group having the inversion bit affixed thereto, the received data is inverted to return to its original state. Subsequently, the data of both of the groups A and B are outputted.

Such data transfer is performed in synchronization with a clock signal transferred from the driver 27 of the transmitting block 21 to the receiver 28 of the receiving block 22.

FIGS. 8A to 13B are specific examples of the inversion/non-inversion of data decided by the signal change detectors 31A and 31B, the statistics analyzer 32 and the combination selector 33.

In cases 1 to 4, described below are specific examples, where a total number of data n=24 is set for each of the groups A and B, and respectively for the groups A and B, the numbers of data to be changed (CountAllA, and CountAllB) are set as follows:

(n/2)+m>CountAllA(=CountH2LA+CountL2HA)>(n/2)

(n/2)+m>CountAllB(=CountH2LB+CountL2HB)>(n/2)

That is, the foregoing case [I] is set, where the numbers of data to be changed of the groups A and B are both in the control range R.

In the case 1 of FIGS. 8A and 8B, as shown in FIG. 8A, for the group A, the results of counting at the signal change detectors 31A and 31B are CountH2LA=7, CountL2HA=6, iCountH2LA=3 and iCountL2HA=8. For the group B, the results of counting are CountH2LB=1, CountL2HB=12, iCountH2LB=10 and iCountL2HB=1.

In the described case, at the statistics analyzer 32, since the numbers of data to be changed are as follows:

CountAllA=CountH2LA+CountL2HA=7+6=13, and

CountAllB=CountH2LB+CountL2HB=1+12=13, the total numbers of data to be changed of the groups A and B are both determined to be in the control range R (the forgoing I).

Subsequently, at the statistics analyzer 32, examination is executed for the combinations of the above 1 to 4 (see FIG. 6).

FIG. 8B shows the result of such examination. In the drawing, each of portions indicated by dotted lines (a) and (b) are differences (DiffCount) between the numbers of data to be changed from high to low and from low to high for the groups A and B respectively, obtained by the foregoing equations (1) to (4).

A portion indicated by a dotted line (c) is a sum total of changes of data in total of the groups A and B (TotalDiffCount), i.e., for all the data transferred in synchronization.

Portions indicated by dotted lines (d) and (e) are calculated values of CountH2LA+CountH2LB and CountL2HA+CountL2HB, respectively. The sum of the numerical values of (d) and (e) becomes the total number (TotalCountAll) of data to be changed from high to low and data to be changed from low to high in total of the groups A and B, i.e., for all the data transferred in synchronization.

As a result, at the combination selector 33, in case 1, the combination of 4 having a smallest absolute value of "TotalDiffCount" is selected (encircled by a 2-dotted chain line in FIG. 8B).

Now, examination will be made of the case of applying the method of the background art, i.e., the method of inverting all the data when the data is not divided into the groups A and B, and half or more of the data is changed, to <case 1>. By the method of the background art, a result is one of the case of inverting none of the data (equivalent to the combination 1 of the embodiment) and the case of inverting all the data (equivalent to the combination 4 of the embodiment). In case 1, the number of data to be changed from high to low is 8, the number of data to be changed from low to high is 18, the number of data changed from high to high (changed from high to low when inverted) is 13, and the number of data to be changed from low to low (changed from low to high when inverted) is 9 (see "ABTotal" section in FIG. 8A.) Accordingly, in the described case, since the number of data to be changed is 8+18=26, which is more than half of the data, data inversion is executed. In the case of the inversion of the data, a sum total of changes after the inversion becomes a difference (13−9=4) between the number of data to be changed from high to low when inverted (13), and the number of data to be changed from low to high when inverted (9). In this case, the results obtained by the method of the embodiment and by the method of the background art are similar to each other.

In case 2, the results of counting at the signal change detectors 31A and 31B are like those shown in FIG. 9A. In the described case, if examination similar to that of case 1 is performed, as shown in FIG. 9B, the combination 2 having a smallest absolute value of "TotalDiffCount" is selected.

Also in this case, if the application of the method of the background art is examined, since half or more of the data is changed in case 2, data inversion is executed. As a result, the case becomes equivalent to the combination 4, and the sum total of changes of data after the inversion becomes "−4". On the other hand, by the method of the embodiment, the combination 2 is selected as described above, making it possible to obtain a result balanced better than that by the method of the background art.

In case 3, the results of counting at the signal change detectors 31A and 31B are like those shown in FIG. 10A. In such a case, if examination similar to that of case 1 is performed, as shown in FIG. 10B, absolute values of "TotalDiffCount" are smallest in the combinations 2 and 3.

Accordingly, since there are a plurality of combinations having smallest absolute values of "TotalDiffCount," in the combinations 2 and 3, a combination having a smallest "TotalCoundAll" (in FIGS. 10A and 10B, the sum of the numerical values of portions indicated by (d) and (e)) is examined. However, in the combinations 2 and 3, the values of "TotalCountAll" are also equal. In such a case, at the combination selector 33, any one of the combinations 2 and 3 can be selected. However, in the embodiment, the combination 2 having a smaller combination number is selected.

Also, in this case, it is possible to obtain a result balanced better than that by the method of the background art.

In case 4, as shown in FIGS. 11A and 11B, the results of counting at the signal change detectors 31A and 31B are like those shown in FIG. 11A. In such a case, if examination similar to that of case 1, is performed, at the combination selector 33, as shown in FIG. 11B, the combination 1 having a smallest absolute value of "TotalDiffCount" is selected. In the combination 1, TotalDiffCount=0 is obtained, which is balanced much better than that in the case of the background art.

Then, in case 5, as shown in FIGS. 12A and 12B, an example is cited, where the number of data to be changed of the groups A and B are both in the control range R (the forgoing I), and the numbers thereof (CountAllA and CountAllB) are as follows:

$(n/2)>CountAllA>(n/2)-m$ $(n/2)>CountAllB>(n/2)-m$

Assuming that no data division is made like in the case of the background art (total 48 bits are maintained), and data inversion is executed when the number of data to be changed is half (24 bits) or more of the total number of data, then no inversion is carried out in case 5, as described below. On the other hand, according to the embodiment, by setting the control range R including a range where the number of data to be changed is less than half of the total number of data for each group, also in this case 5, inversion/non-inversion is examined.

In case 5, the results of counting at the signal change detectors 31A and 31B are like those shown in FIG. 12A.

In this case, at the statistics analyzer 32, the total numbers of data to be changed are as follows:

$CountAllA=CountH2LA+CountL2HA=7+3=10$, and $CountAllB=CountH2LB+CountL2HB=7+3=10$.

It is determined that the numbers of data to be changed of the groups A and B are both in the control range R (the forgoing I).

In such a case, if examination similar to that of <case 1> is performed, at the combination selector 33, as shown in FIG. 12B, the combination 4 has a smallest absolute value of "TotalDiffCount". Thus, the combination 4 is selected.

In case 5, even in the case of $(n/2)>CountAllA$ and $(n/2)>CountAllB$, a well-balanced result is obtained by executing inversion. Needless to say, it is possible to obtain a result balanced better than that by the method of the background art where no consideration is given to examination as to inversion/non-inversion.

In case 6, an example is cited, where the numbers of data to be changed of the groups A and B are both in the control range R (the forgoing I), and the numbers thereof are as follows:

$(n/2)>CountAllA>(n/2)-m$ $(n/2)+m>CountAllB>(n/2)$

In case 6, the results of counting at the signal change detectors 31A and 31B are like those shown in FIG. 13A.

In this case, the numbers of data to be changed are as follows:

$CountAllA=CountH2LA+CountL2HA=7+7=14$, and $CountAllB=CountH2LB+CountL2HB=7+3=10$.

In such a case, if examination similar to that of case 1 is performed, at the combination selector 33, as shown in FIG. 13B, the combination 4 has a smallest absolute value of "TotalDiffCount," and this combination 4 is selected.

In this case 6, even when $(n/2)>CountAllA$ in the group A, it is possible to obtain a well-balanced result by executing inversion.

As described above, the Transferring Data is divided into the two groups A and B, execution of inversion/non-inversion are examined for each of the groups A and B, and a best-balanced combination thereof is selected. Moreover, for the examination, the control range R is set, and the inversion of data is examined. Especially, by executing inversion even for the following range, it is possible to select a combination balanced better than that of the case of the background art:

$(n/2)>CountAllA>(n/2)-m$, and $(n/2)>CountAllB>(n/2)-m$

In this way, during data transfer, the sum total of changes of the data can be greatly reduced through all the signal lines 14. As a result, EMI can be effectively suppressed.

Further, if there are a plurality of combinations having equal sum totals of changes for the groups A and B, EMI can be suppressed by selecting a combination, where the total number of data to be changed of the groups A and B is small.

Figure 14:
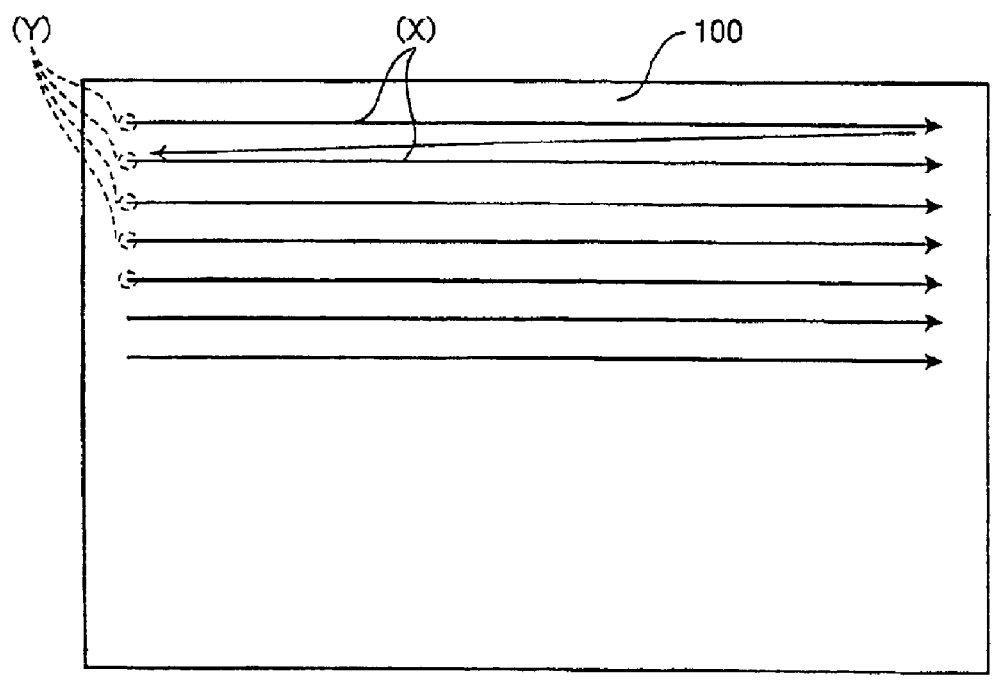
FIG. 14 is a view showing a place provided with an initial value of an inversion bit.

As described above, screen displaying is performed at the liquid crystal display device 10 by transferring the data from the controller 13 to each driver 12. In this case, as shown in FIG. 14, based on the data transferred from the controller 13 to each driver 12, scanning is carried out in a horizontal direction indicated by an arrow (X) to perform displaying on a display area 100 of the screen to be displayed, and then after going down by one stage, horizontal scanning is carried out again to perform displaying. This processing is repeated. In such processing, generally, data is transferred by division for each stage.

According to the embodiment, an initial value of the inversion bit is set when data is transferred for each stage as indicated by the arrow (X). As can be understood from the foregoing, the inversion bit is set based on Transferring Data and "data transferred immediately before." In other words, the inversion bit is affixed to the Transferring Data on and after a second clock. Thus, according to the embodiment, for each stage, at the time of starting data transfer for displaying the starting point of scanning (in FIG. 14, a portion encircled by a dotted line (Y)), initial values of the inversion bits for the groups A and B are preset. In this way, even for Transferring Data at a first clock at the time of starting data transfer, data inversion can be executed.

Specifically, when the data of the groups A and B are transferred from the controller 13 side at a first clock, based on the preset initial values of the inversion bits, one or both of the data of the groups A and B are inverted and then transmitted.

In this case, on the end (left end in FIG. 14) of the display area 100 as a scanning starting point of each stage, wall paper, the display frame of an application software or the like is frequently displayed and, thus, there is a high possibility that data is always the same. Therefore, presetting of the initial value of the inversion bit is effective.

In addition, on the expectation that the inversion will effectively reduce EMI, the initial values of inversion bits of the groups A and B may be set in such a way as to execute inversion for one of the groups A and B but not for the other. This setting may also be effective.

In the foregoing embodiment, the control range R was set. However, the control range R may be properly set based on prior examination. That is, the control range may be set so as to include all the numbers of data of the groups. In this case, in other words, the numbers of data to be changed of the groups A and B are both in the control range R for all the cases, and the data inversion in the foregoing I is examined.

In the foregoing embodiment, the example of dividing the data into the two groups A and B was described. However, the number of groups is not limited to two, and the present invention can be applied to the case of dividing the data into three or more groups. Moreover, the number of groups, into which the data is divided, may be set equal to the number of signal lines 14. Also in this case, as in the case of the embodiment, the combinations of inversion/non-inversion of data of all the groups are examined.

FIGS. 15A to 15D show numerical values and calculation equations used for examination. Specifically, FIG. 15A shows the results of counting for each group at the signal change detectors 31A and 31B, where z denotes the number of groups and j denotes an optional value equal to z or lower; FIG. 15B equations for obtaining DiffCount (j) and iDiffCount (j) of a j-th group; and FIGS. 15C and 15D equations for calculating "TotalDiffCount" and "TotalCountAll" for each combination. Each group has two states of inversion and non-inversion, and thus the number of all combinations for z groups is 2 z. In each of the equations of FIGS. 15C and 15D, a portion "?" indicates the "i" only when inversion is executed.

Then, at the combination selector 33, a combination having a smallest absolute value of "TotaiDiffCount" is selected. If there are a plurality of combinations having smallest absolute values of "TotalDiffCount," one having a smallest "TotalCountAll" is selected therefrom.

As in the case of the embodiment, the control range R may be set, and inversion/non-inversion may be decided under the conditions of I, II and III.

In the foregoing embodiment, when the combinations 1 to 4 were examined based on the inversion/non-inversion for each group, "TotalDiffCount", i.e., the combination having the smallest sum total of changes of data of all the groups, was selected. However, selection is not always limited to the combination having the smallest sum total. It is effective as long as the sum total of changes of data of all the groups is smaller than that in the case where no data inversion is carried out. For example, a combination having "TotalDiffCount" set equal to a predetermined numerical value or lower may be selected.

The embodiment has been described by taking the example of applying the invention to data transfer between a control IC (controller 13) and a driving IC (driver 12) of the liquid crystal display device 10. The invention is not limited to the embodiment and can be advantageously applied to the transfer of data of specified bits at the other types of a display device, a data transfer device, a data transmitter, a data receiver, and so on.

As apparent from the foregoing, according to the present invention, it is possible to effectively suppress EMI during data transfer.

Although the preferred embodiment of the present invention has been described in detail, it should be understood that various changes, substitutions and alternations can be made therein without departing from spirit and scope of the inventions as defined by the appended claims.

What is claimed is:

1. A data transfer device comprising:
   a transmitting block,
   a receiving block,
   a display device connected to said receiving block, and
   a plurality of signal lines;
   wherein data is transferred from said transmitting block through said plurality of signal lines to said receiving block,
   said transmitting block includes:
      a determination unit for dividing said signal lines into a plurality of groups and determining either inversion or non-inversion of data to be transferred regarding data transferred through said signal lines of each group, wherein said determination unit comprises a counting circuit adapted for counting a difference between data to be transferred and data transferred immediately before said data to be transferred for each said group;
      an inversion unit for inverting the data to be transferred for the group determined to be subjected to data inversion by the determination unit; and
      a transmission unit for transmitting the data through said signal lines, and said receiving block includes:
      a receiving unit for receiving the data transferred through said signal lines;
      a decoding unit for returning, among the data received by the receiving unit, the data of the group having been subjected to the data inversion by the inversion unit to an original state; and
      a statistics analyzer adapted to receive an output from said counting circuit, wherein said statistics analyzer is adapted to determine whether any of:
      neither data of each said group is inverted;
      data of a first group is inverted while data of a second group is not inverted;
      data of said second group is inverted while data of said first group is not inverted; and
      data of each group is inverted,
         wherein said statistics analyzer comprises a control range checking unit.

2. The data transfer device according to claim 1, wherein said transmitting block further includes an inversion signal output unit for outputting a signal indicating completed inversion in synchronization with data of the group, regarding the group having been subjected to the inversion by the inversion unit.

3. The data transfer device according to claim 1,
   wherein the determination unit counts the number of data to be transferred, which is different from data transferred immediately therebefore for each group, and the determination unit selects a combination of either inversion or non-inversion for each group based on a result of the counting in order to minimize a sum total of changes of data for all the groups.

4. A display device, comprising:
a plurality of drivers for driving a display panel;
a controller for controlling said drivers; and
a predetermined number of signal lines wired between said drivers and said controller, wherein said controller includes:
 a determination unit for determining whether inversion should be performed or not for each group, regarding digital signals to be transferred through said signal lines divided into a plurality of groups, wherein said determination unit comprises a counting circuit adapted for counting a difference between data to be transferred and data transferred immediately before said data to be transferred for each said group;
 an inversion unit for inverting the digital signals to be transferred for the group determined to be inverted by the determination unit; and
 a transmission unit for transmitting the digital signals to said signal lines, and each of said drivers includes:
 a receiving unit for receiving the digital signals transferred through said signal lines;
 a decoding unit for returning, among the digital signals received by the receiving unit, a digital signal of the group having been subjected to digital signal inversion by the inversion unit to the original signal, and
 a statistics analyzer connected to receive an output from said counting circuit, wherein said statistics analyzer is adapted to determine whether any of:
 neither data of each said group is inverted;
 data of a first group is inverted while data of a second group is not inverted;
 data of said second group is inverted while data of said first group is not inverted; and
 data of each group is inverted,
 wherein said statistics analyzer comprises a control range checking unit.

5. A data transmitter for transmitting data of predetermined bits, comprising:
 a counting circuit for dividing data into a plurality of groups, and for counting a difference between data to be transferred and data transferred immediately before said data to be transferred for each said group;
 a selection circuit for selecting either inversion or non-inversion for the data to be transmitted for each group;
 an inversion circuit for inverting the data to be transmitted for the group, of which the data is determined to be inverted by said selection circuit;
 a display device adapted to display said data; and
 a statistics analyzer connected to receive an output from said counting circuit, wherein said statistics analyzer is adapted to determine whether any of:
 neither data of each said group is inverted;
 data of a first group is inverted while data of a second group is not inverted;
 data of said second group is inverted while data of said first group is not inverted; and
 data of each group is inverted,
 wherein said statistics analyzer comprises a control range checking unit.

6. The data transmitter according to claim 5, wherein said selection circuit selects either inversion or non-inversion of the data to be transmitted for each group, based on whether the number of data to be changed counted for each group by the counting circuit is in a predetermined range or not.

7. The data transmitter according to claim 6, wherein in said selection circuit, the range is set to include less than n/2 regarding n-bit data transmitted for each group.

8. The data transmitter according to claim 6, wherein, when the numbers of data to be changed are in the predetermined range for all the groups, said selection circuit selects either inversion or non-inversion of each group in order to reduce a sum total of changes of data of all the groups.

9. The data transmitter according to claim 6, wherein, when the numbers of data to be changed are out of the predetermined range for all the groups, said selection circuit selects inversion of data regarding a group having the number of data to be changed exceeding the predetermined range, and selects non-inversion of data regarding a group having the number of data to be changed below the predetermined range.

10. The data transmitter according to claim 6, wherein, when the number of data to be changed, which is a value obtained by adding up the number of data to be changed in one direction and the number of data to be changed in an opposite direction, is out of the predetermined range for at least one group, said selection circuit selects inversion of data if the number of data to be changed exceeds the predetermined range regarding the group out of the range, and non-inversion of data if the number of data to be changed is below the predetermined range, and then regarding the other group having the number of data to be changed in the predetermined range, said selection circuit compares the case of data inversion with the case of data non-inversion, and selects the case having data of a lower amount of changes, which is a value obtained by subtracting the numbers of data to be changed in one and opposite directions from each other.

11. A data receiver, comprising:
 a receiving unit for receiving data of predetermined number of bits transferred after having been divided into a plurality of groups;
 an inversion bit determination unit for determining affixment of an inversion bit to the data received by said receiving unit for each group;
 a decoding unit for inverting the data received by said receiving unit for the group determined to have the affixment of the inversion bit by said inversion bit determination unit;
 a counting circuit adapted for counting a difference between data to be transferred and data transferred immediately before said data to be transferred for each said group;
 a display device adapted to display said data; and
 a statistics analyzer adapted to receive an output from said counting circuit, wherein said statistics analyzer is adapted to determine whether any of:
 neither data of each said group is inverted;
 data of a first group is inverted while data of a second group is not inverted;
 data of said second group is inverted while data of said first group is not inverted; and
 data of each group is inverted,
 wherein said statistics analyzer comprises a control range checking unit.

12. A data transfer method, comprising:
 dividing of data of a predetermined number of bits to be transferred into a plurality of groups;

counting a difference between data to be transferred and data transferred immediately before said data to be transferred for each group;

deciding either inversion or non-inversion for each group in order to reduce electromagnetic interference;

inverting data to be transferred for a group determined to be subjected to inversion;

transferring the data;

presetting either inversion or non-inversion of data to be transferred for each group regarding a first data to be transferred before starting said data transfer;

displaying said data on a display device, and
deciding, through a statistics analyzer, which receives an output from a counting circuit, whether any of:
neither data of each said group is inverted;
data of a first group is inverted while data of a second group is not inverted;
data of said second group is inverted while data of said first group is not inverted; and
data of each group is inverted, and
wherein said statistics analyzer comprises a control range checking unit.

13. A data transfer method, comprising:

dividing data of a predetermined number of bits to be transferred into a plurality of groups and transmitting data to be transferred for each group after either inversion or non-inversion thereof in order to minimize a sum total of changes of data of all the groups at a data transmission side;

counting a difference between data to be transferred and data transferred immediately before said data to be transferred for each group;

inverting received data for the group having been subjected to data inversion at a data receiving side;

determining through a statistics analyzer whether any of:
neither data of each said group is inverted;
data of a first group is inverted while data of a second group is not inverted;
data of said second group is inverted while data of said first group is not inverted; and
data of each group is inverted, said statistics analyzer comprises a control range checking unit; and
displaying said data on a display device.

14. The data transfer method according to claim 13, further comprising:

examining combinations of two states of data inversion and non-inversion for each group; and selecting a combination having the smallest number of data to be changed, when a result of said examining step shows that there are a plurality of combinations for minimizing a sum total of changes of data of all the groups.

15. The data transfer method according to claim 13, comprising:

counting for each group a number of data where the change in the course from the data transmitted immediately before to the data to be transmitted is high to low (CountH2L), a number of data where the change in the course from the data transmitted immediately before to the data to be transmitted is low to high (CountL2H), a number of data subjected to inversion where the change in the course from the data transmitted immediately before to the data to be transmitted is high to low (iCountH2L) and a number of data subjected to inversion where the change in the course from the data transmitted immediately before to the data to be transmitted is low to high (iCountL2H);

calculating data variation (DiffCount=CountH2L−CountL2H) for each group and data variation (iDiffCount−iCountH2L−iCountL2H) for each group in the case of inversion; and selecting a combination for minimizing a sum total of changes of data of all the groups, based on the data variation (DiffCount) and the data variation (iDiffCount) for each said group.

* * * * *